United States Patent Office.

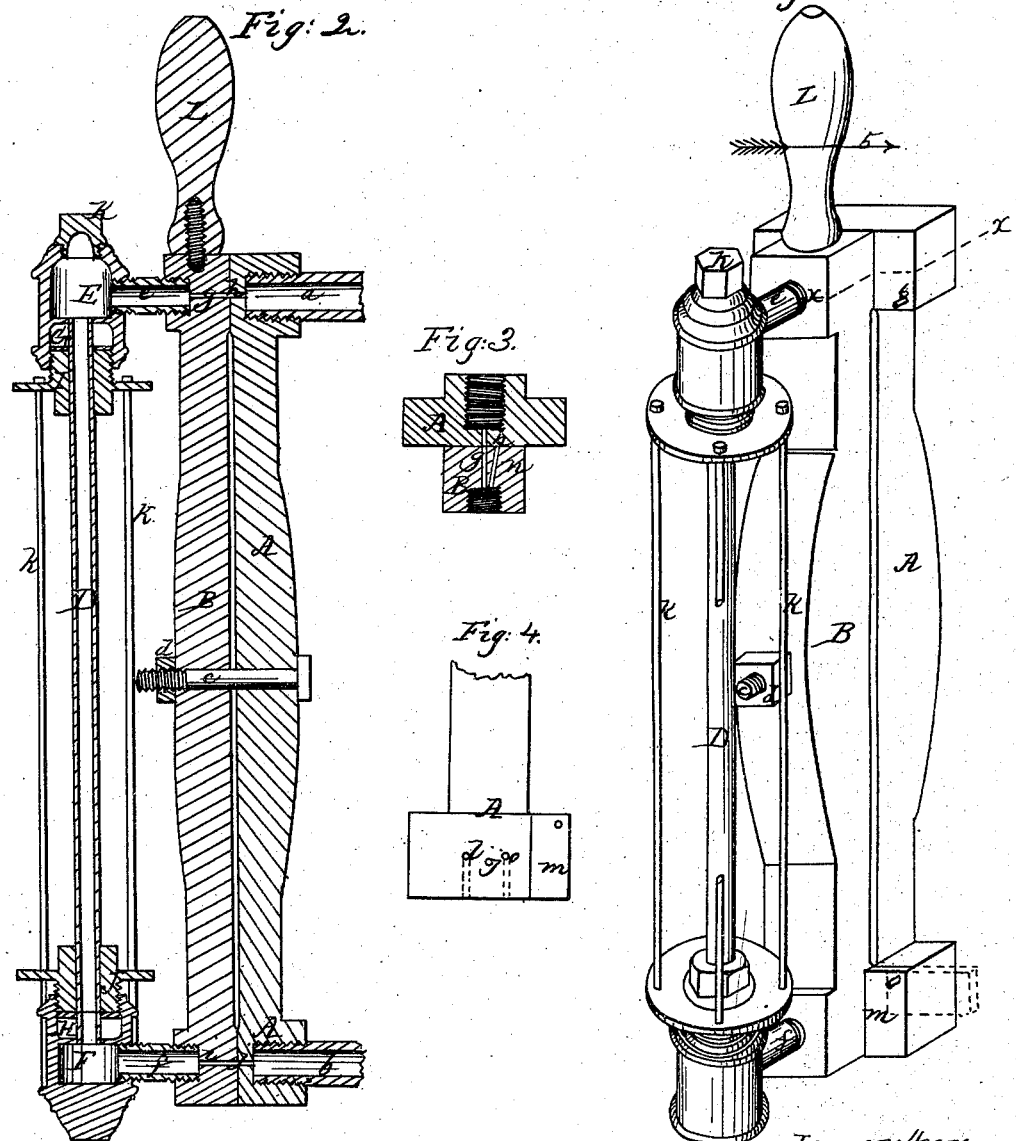

CHARLES LOWELL RIDGWAY, OF BOSTON, MASSACHUSETTS.

*Letters Patent No. 78,234, dated May 26, 1868.*

IMPROVED WATER-GAUGE FOR STEAM-BOILERS.

The Schedule referred to in these Letters Patent and making part of the same.

TO ALL WHOM IT MAY CONCERN:

Be it known that I, CHARLES LOWELL RIDGWAY of Boston, in the county of Suffolk, and State of Massachusetts, have invented an Improved Water-Gauge for Steam-Boilers, of which the following is a full, clear, and exact description, reference being had to the accompanying drawings, making part of this specification, in which—

Figure 1 is a perspective view of my improved water-gauge.
Figure 2 is a central vertical section through the same.
Figure 3 is a horizontal section on the line $x\,x$ of fig. 1.
Figure 4, detail to be referred to.

My invention relates to that class of water-gauges for steam-boilers in which the water is admitted into a glass tube, for the purpose of ascertaining its height within the boiler; and my invention consists in attaching the gauge to a lever or bar, through which pass the inlet-passages which communicate with the boiler, the lever being so pivoted and arranged, that, when vibrated on its centre, it will open or close the inlet-passages simultaneously, thus affording a simple and ready means of instantly cutting off the connection with the boiler in case of the breakage of the glass tube, or when otherwise required, while the lever may be also moved into a position to close the lower inlet-passage, admit the steam at the top of the gauge, and also open a passage at its lower end, when it is desired to "blow off," for the purpose of clearing the gauge of sediment or dirty water.

To enable others skilled in the art to understand and use my invention, I will proceed to describe the manner in which I have carried it out.

In the said drawings, A is a metal bar, which is secured to the boiler in a vertical position by means of the inlet-pipes $a\,b$, the former being for steam and the latter for water.

From this bar A projects a bolt, $c$, on which is hung a lever or bar, B, secured in place by a nut, $d$, on the end of the bolt. This lever B slides in contact with the bar A at each end, and carries the gauge which is attached thereto by means of short tubes, $e\,f$, which communicate with the boiler through small passages, $g\,h$ $i\,j$, passing through the lever B and bar A, the surfaces of which, where they come into contact with each other, being ground, so as to form steam-tight joints.

D is a glass tube, the ends of which communicate with the hollow chambers E F, and pass through stuffing-boxes G H, filled with suitable packing, kept in place by the screw-nuts or followers I J, which are provided with flanges for the support of the guard-rods $k$. K is a screw-cap at the top of the gauge, through which to put in and take out the glass tube D.

When the parts are in the position which they occupy in the drawings, the passages $g\,h$ and $i\,j$ are brought opposite to each other, thus affording a direct communication from the gauge to the interior of the boiler, steam being admitted through the upper inlet-passages, $g\,h$, and water through the lower ones, $i\,j$.

When it is desired to entirely cut off the connections with the boiler, it is simply necessary to take hold of a handle, L, projecting from the top of the lever B, and vibrate it slightly on its centre, in the direction of the arrow 5, until it strikes a stop-pin, 6. The ends of the lever B are thus caused to slide upon the bar A, carrying the passages $g\,i$ away from those, $h\,j$, and thus, by a single movement of the lever B, the connections with the boiler may be cut off simultaneously in the event of the breaking of the glass tube D, or when, from any cause whatsoever, it may be found desirable to do so, the same movement of the lever B bringing the passage $i$ opposite to a passage, $l$, in the lower end of the bar A, (seen partially dotted in fig. 4,) so as to allow the water in the glass tube D to escape as required. On returning the lever to its original position, to open the connections with the boiler, the lower end will strike against an adjustable stop, $m$, which, when in the position seen in black lines in fig. 1, insures the passages $g\,h$ and $i\,j$ being brought exactly opposite to each other, as required.

When it is desired to "blow off" the gauge, to clear it of sediment or dirty water, the stop $m$ is moved into the position represented in red in fig. 1, and the lever B vibrated in a direction contrary to the arrow 5, until it is arrested by the stop. This movement of the lever B closes the lower inlet-passages, and at the same time brings an additional passage, $n$, (fig. 3,) opposite to the passage $h$, and the passage $i$ opposite to a passage, $o$, in the bar A, (see fig. 4,) when the steam will pass into the glass tube D, and out through the passage $o$, as required.

It is evident that the bar A might be dispensed with, the lever B being pivoted on a bolt projecting directly out from the boiler, and sliding, in contact with disks or plates, on the outer ends of the inlet-pipes $a$ $b$. I prefer, however, the method first described.

It will be seen that the cocks ordinarily employed in the inlet-pipes are dispensed with, and also the "pet-cock" at the bottom of the gauge, thus simplifying its construction, and reducing the cost of manufacture.

*Claims.*

What I claim as my invention, and desire to secure by Letters Patent, is—

The water-gauge D, attached to a lever or bar, B, provided with passages $g$ $i$, and arranged, in relation to the inlet-passages or tubes through which the water and steam are admitted from the boiler, substantially as described.

I also claim the passages $h$ $n$ $i$ $o$ in the bar A, and lever B, in combination with the adjustable stop $m$ or its equivalent, so arranged as to allow the steam to be blown through the gauge, substantially as set forth.

I also claim the passage $i$ in the lever B, in combination with the passage $l$ in the bar A, and the stop-pin 6, arranged so as to allow the water in the glass tube D to escape when the connections with the boiler are cut off, substantially as described.

CHARLES LOWELL RIDGWAY.

Witnesses:
P. E. TESCHEMACHER,
W. J. CAMBRIDGE.